United States Patent [19]

Iyengar

[11] 4,383,865

[45] May 17, 1983

[54] SOFT TEXTURED HIGH STRENGTH ALKALI BLUE PIGMENT

[75] Inventor: Doreswamy R. Iyengar, Holland, Mich.

[73] Assignee: BASF Wyandotte Corporation, Wyandotte, Mich.

[21] Appl. No.: 271,594

[22] Filed: Jun. 8, 1981

[51] Int. Cl.³ .................. C04B 31/44; C08J 3/02; C08J 7/12
[52] U.S. Cl. .................. 106/308 N; 106/288 Q; 260/389
[58] Field of Search .................. 260/389, 208; 8/590, 8/597; 106/288 Q, 308 N

[56] References Cited

U.S. PATENT DOCUMENTS

| | | | |
|---|---|---|---|
| 1,799,305 | 10/1930 | Brandt et al. | 8/597 |
| 1,945,221 | 6/1934 | Gassner et al. | 8/590 |
| 1,990,852 | 7/1935 | Zabel et al. | 8/597 |
| 3,014,810 | 12/1961 | Dybalski et al. | 106/308 N |
| 3,016,384 | 1/1962 | Caliezi | 260/208 |
| 4,032,357 | 6/1977 | Rees et al. | 106/288 Q |
| 4,204,879 | 5/1980 | Paskins et al. | 100/288 Q |

*Primary Examiner*—Charles F. Warren
*Assistant Examiner*—Raymond K. Covington
*Attorney, Agent, or Firm*—Bernhard R. Swick; Norbert M. Lisicki

[57] ABSTRACT

Alkali blue pigment composition characterized by a soft texture and high strength. Pretreated aqueous solutions of the alkali blue pigments are treated with an alkaline solution of an alkyarylsulfonic solution of an amine to recover the desired pigment composition.

12 Claims, No Drawings

SOFT TEXTURED HIGH STRENGTH ALKALI BLUE PIGMENT

BACKGROUND OF THE INVENTION

1. Field of the Invention

The invention relates to a pigment composition and to a process for its manufacture. More particularly the invention relates to an improved Alkali Blue pigment composition characterized by a soft texture and high strength and to a process for its manufacture.

2. Description of the Prior Art

"Alkali Blue" is generally known in the art as, and is used herein to define, an arylpararosaniline sulfonic acid of the general formula

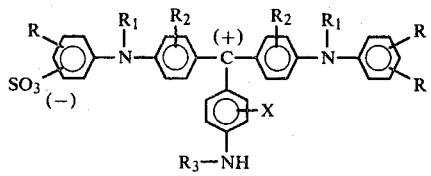

wherein R may be hydrogen, chlorine, bromine, alkyl containing from 1 to 4 carbon atoms, alkoxy containing from 1 to 4 carbon atoms, nitro-, amino-, sulfonamide-alkylamino containing from 1 to 4 carbon atoms, $R_1$ and $R_2$ may be hydrogen, or alkyl containing from 1 to 4 carbon atoms, $R_3$ may be hydrogen or phenyl with or without a grouping such as R and X may be hydrogen, chlorine, bromine, $SO_3H$ or COOH.

Due to the strongly polar hydrophilic property of the pigments represented by the above general formula, moist press cakes of these pigments, upon drying, tend to form hard agglomerates and aggregates. Additionally, the extremely fine particle size of the pigment with the resulting hydrogen bonding at the surface makes it extremely difficult to produce ink paste suitable for use in printing by employing the three-roll mill dispersion of the dry pigment into vehicles imparted for that purpose. The difficulties which are associated with the dispersion of thermally dried Alkali Blue press cakes are well known to those skilled in the art and have also been disclosed in various publications, e.g., E. K. Fischer, Am. Inkmaker 23 (1945) No. 12 and T. C. Patton, Editor, Pigment Handbook, Vol. 1, page 620.

As a result of the difficulties associated with the dispersion of the dry Alkali Blues for technical use, other methods have been developed suitable for use in, e.g., the printing ink industry. One of these is called the "flush process." In this process the water wet pigment in the press cake is transformed to an oil wet product by kneading in a double arm mixer with the desired vehicle. The water which separates out is drained off and the "flush" is subjected to vacuum treatment or transferred to a roll mill and milled until the remaining residual water has been evaporated. The flush paste is then ready for use directly in ink formulations. The product thus produced usually contains from 35 to 40 percent by weight of the pigment.

In order to prepare large quantities of pigment by the flushing procedure, large size kneading machines working discontinuously are necessary which results in high manufacturing costs. The high vehicle content (60 to 65 percent by weight) in the pigment paste made by the flushing procedure leads to other difficulties associated with compatibility with other ink vehicles for various end uses and in the balancing of properties such as color strength, viscosity, tack, etc. at the required concentration levels in the formulated inks.

As a result, numerous attempts have been made to manufacture more concentrated pigment compositions which can be used in a wide variety of applications. Pigment preparations (containing 10 to 70 percent by weight of natural synthetic acidic resins) which can be dried and converted into readily dispersible pigment powders with high tinctorial strength and grain softness have been reported.

U.S. Pat. No. 4,032,357 teaches the preparation of an Alkali Blue powder and a process for manufacture of same by treatment of an aqueous alkaline solution of a pigment with an organic acid dispersant followed by the addition of a hydrophobic oil phase. U.S. Pat. No. 3,925,094 teaches the preparation of dyestuffs by employing resin acids in order to obtain pigments with good dispersion and high strength. U.S. Pat. No. 3,635,745 teaches the preparation of dyestuffs by treating alkaline solutions of the pigment with an aqueous alkaline solution of resinic acids or the acid modified products thereof. U.S. Pat. No. 4,189,328 teaches the preparation of Alkali Blue pigment compositions by treatment of the Alkali Blue pigments with phenols, cresols and naphthols. None of the prior art teaches the use of amines by themselves or in combination with other surfactants to produce soft textured high strength Alkali Blue pigment compositions.

DESCRIPTION OF THE PREFERRED EMBODIMENT

A soft textured high strength Alkali Blue pigment is produced by adding to a caustic solution of the Alkali Blue, produced by phenylation with aniline of parafuchsin, sulfonation (primarily to mono) with sulfuric acid and subsequent drowning in water, a suitable quantity of an alkyl aryl sulfonic acid, the resulting solution of which is subsequently mixed with an acid solution of an amine. The pH of the slurry is adjusted to below 1.0 and after heating, the slurry is cooled, the pigment is filtered, washed and dried at suitable temperatures.

More specifically, a crude Alkali Blue, produced by phenylation with aniline of parafuchsin, sulfonation (primarily to mono) with sulfuric acid and subsequent drowning in water, is dissolved in aqueous sodium hydroxide to obtain a solution at a pH of from 12.6 to 13.0 and which contains from 4 to 10 percent by weight, of the Alkali Blue on a dry basis. To this solution is added from 2 to 20 percent, and preferably from 5 to 12 percent, based on the weight of pigment, of an alkyl aryl sulfonic acid or sulfonate. Following this addition, the solution is well stirred and heated in the range from 50° C. to 95° C., preferably from 55° C. to 65° C. This solution is next mixed with an amine or mixture of amines, equivalent in weight to the alkyl aryl sulfonic acid/sulfonate previously added. The amine is used as a solution in an aqueous mineral acid, preferably dilute hydrochloric acid containing from 4 to 10 percent by weight HCl in an amount sufficient to fully neutralize the caustic and precipitate out the Alkali Blue pigment. The pH of the resultant pigment slurry upon admixture with the hydrochloric acid solution is adjusted to a pH of less than 1.0, preferably from 0.8 to 0.85, by using additional HCl acid if necessary. The pigment slurry is slowly heated and held at a temperature in the range of 80° C. to 100° C., from 0 to 60 minutes, depending on the amount and nature of additives used, after which the slurry is flooded with cold water bringing the temperature down to 60° C. It is then filtered, washed free of salt and dried at a temperature in the range of 40° to 80° C., preferably between 50° and 60° C.

Alternatively, Alkali Blue pigment in the form of a regular, untreated presscake made from reprecipitating crude Alkali Blue from a caustic solution using a mineral acid, to obtain pigmentary properties, filtered and washed, is stirred into water by suitable means to obtain a lumpfree smooth slurry. An amine or a mixture of amines dissolved in an aqueous acid solution is mixed with the slurry. The resulting mixture is treated with an aqueous solution of an alkyl aryl sulfonic acid or sulfonate, filtered, washed and dried to obtain a high strength and soft textured Alkali Blue pigment.

More specifically, in the above process, a known amount of Alkali Blue pigment in the form of a presscake is stirred into water using a Premier Disperator at 3000 to 6000 rpm for 10 to 30 minutes to obtain a smooth slurry containing from 5 to 10 percent by weight pigment. A solution of an amine or mixture of amines in aqueous 2 to 10 percent by weight mineral or water soluble carboxylic acid (e.g., acetic acid), where the total amine content is 2 to 20 percent and preferably 5 to 12 percent by weight of the dry pigment is then mixed with the pigment slurry. The resulting mixture is treated with a predetermined amount of alkyl aryl sulfonic acid or sulfonate equivalent to the amine(s) used. The sulfonic acid or sulfonate used is in the form of an aqueous solution preferably in the range 5 to 15 percent by weight. Finally, the slurry is stirred at high speed for 10 to 30 minutes or given several passes through a colloid mill before it is filtered, washed and dried in the range 40° to 80° C., preferably between 50° and 60° C.

The alkyl aryl sulfonic acid compounds which may be employed in the invention can contain from 1 to 14 carbon atoms in the alkyl portion of the molecule.

The amines which may be employed in the practice of the invention have the following formula:

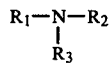

wherein $R_1$ is an alkyl radical containing from 3 to 36 carbon atoms or a phenyl radical or benzyl radical, $R_2$ and $R_3$ may be hydrogen or identical with $R_1$. Among those amines contemplated are diethylamine, triethylamine, n-propylamine, dipropylamine, tripropylamine, allylamine, diallylamine, triallylamine, butylamine, dibutylamine, tributylamine, amylamine, diamylamine, triamylamine, cyclohexylamine, hexylamine, dicyclohexylamine, 1,3-dimethylbutylamine, 2-aminoheptane, 2-amino-4-methylhexane, 1,4-dimethylpentylamine, 2-ethylhexylamine, bis(2-ethylhexylamine), 1-cyclopentyl-2-aminopropane, bis(1-ethyl-3-methylpentyl)-amine, 1,1,3,3-tetramethylbutylamine, octylamine, aniline, benzylamine, methylbenzylamine, phenylethylamine, diphenylamine, methyldiphenylamine, tribenzylamine, triphenylamine, dodecylamine, tetradecylamine, cocoamine, n-hexyldecylamine, dimethyloctadecylamine, octadecylamine, tallow amine, hydrogenated tallow amine, soyamine, dicocoamine and mixtures thereof.

The following Examples exemplify the invention. All parts are by weight unless otherwise designated.

EXAMPLE 1

Into a one liter beaker was added 522.5 grams of an aqueous NaOH solution (pH=12.6) containing 50 grams of red shade Alkali Blue, produced by phenylation with aniline of parafuchsin, sulfonation (primarily to mono) with sulfuric acid and subsequent drowning in water. To this was added 50 grams of a 2 percent by weight aqueous NaOH solution containing 8.3 grams of dodecyl benzene sulfonic acid. The mixture was stirred and maintained at a temperature of 60° C. In a separate large beaker, 7.5 grams of dimethyloctadecylamine was dissolved in 730 grams of a 2 percent by weight aqueous HCl solution. The acid solution of the amine was slowly added to the HCl solution. The slurry mixture was maintained at 60° C. Sufficient 10 percent by weight HCl was added to the slurry to adjust the pH to about 0.8. The slurry was then heated to 95° C. and maintained at the temperature for 5 minutes. The slurry was then flooded with cold water, cooling the temperature to 60° C. The mixture was filtered, washed with water and the resulting press cake dried at 50° C. The pigment obtained was strong in tint and dispersed easily in oleo-resinous vehicles.

EXAMPLE 2

Into a one liter beaker was added 467.3 grams of a 2 percent by weight aqueous NaOH solution containing 50 grams of Alkali Blue, produced by phenylation with aniline of parafuchsin, sulfonation (primarily to mono) with sulfuric acid and subsequent drowning in water. To this was added 50 grams of 2 percent by weight aqueous NaOH solution containing 3.58 grams of dodecylbenzene sulfonic acid. The mixture was stirred and maintained at 60° C. In a separate beaker 3.24 grams of dimethyloctadecylamine was dissolved in 800 grams of 1.5 percent by weight aqueous HCl. This solution was heated to 60° C. and the alkaline solution of pigment was slowly added to it. The pH of the resulting slurry was adjusted to 0.85 and heated to boiling. After 10 minutes the slurry was flooded with cold water to a temperature of 60° C., the pigment filtered, washed and dried at 55° C. The resulting blue pigment was very strong in tint and soft in texture.

EXAMPLE 3

An experiment such as described in Example 2 was repeated, except that Armeen-C, made by Armak Company, (coco-amine; 95% primary, 5% secondary and tertiary) was used in place of dimethyloctadecylamine. The resulting pigment was again strong in tint and soft in texture.

EXAMPLE 4

Example 2 was repeated, except that Duomeen-C, made by Armak Company, (N-coco-1, 3-diaminopropane; primary amine content-43%, secondary amine content-43%) was employed in place of dimethyloctodecylamine. The pigment recovered was strong in tint and soft in texture similar to that obtained in Example 2.

EXAMPLE 5

4116 g of a blend of regular, untreated Alkali Blue presscakes, made from reprecipitating crude Alkali Blue from a caustic solution using a mineral acid, to obtain pigmentary properties, filtered and washed, containing 1000 g of dry pigment was placed in a 5 gallon can and blended with 9 liters of water using a Premier Disperator at 5000 rpm for 15 minutes to obtain a smooth slurry. 46 g of Armeen DM-18-D, made by Armak Company, (dimethyloctadecylamine) dissolved in 250 g of water containing 10 g of hydrochloric acid was slowly added to the pigment slurry followed by 15 minutes of high speed stirring. 50 g of dodecylbenzene sulfonic acid in the form of a 10 percent solution in water was next slowly added to the pigment slurry which was subsequently mixed thoroughly for another 15 minutes at ca. 6000 rpm. The slurry was filtered by suction, washed and dried at 50° C. to obtain about 1070 g of an intense blue pigment which was very strong in tint and very easy to disperse in oleoresinuous vehicles.

EXAMPLE 6

Example 3 was repeated except that Colloid Mill, Colby Disperser/Homogenizer made by Colby Associates, was used for dispersion in place of the Premier Dispersator. The slurry was given three passes through the Colloid Mill before addition of the amine solution, three passes after the addition of the amine solution and finally, three more passes after the addition of dodecylbenzene sulfonic acid solution. The strong and soft textured product recovered following filtration, washing and drying was similar to that obtained in Example 3.

EXAMPLE 7

This experiment was similar to Example 3 except that (a) acetic acid was used in place of HCl to dissolve the amine before its addition to the pigment slurry; and (b) following the incorporation of dodecylbenzene sulfonic acid, the pigment slurry was directly dried without any intermediate filtration and washing.

The pigment recovered had excellent strength and very good texture.

The embodiments of the invention in which an exclusive privilege or property is claimed are defined as follows:

1. A process for preparing a soft textured high strength Alkali Blue pigment composition consisting of insolubilized amines and Alkali Blue pigments wherein the crude Alkali Blue produced by phenylation with aniline of parafuchsin, sulfonation primarily to mono with sulfuric acid and subsequent drowning in water, is dissolved in an aqueous solution of NaOH, which comprises mixing said solution first with (a) an alkaline solution of an alkyl aryl sulfonic acid and subsequently with (b) an acid solution of an amine containing from 3 to 36 carbon atoms and recovering said pigment composition.

2. The process for preparing a soft textured high strength Alkali Blue pigment composition consisting of insolubilized amines and Alkali Blue pigments wherein a regular, untreated Alkali Blue presscake, made from reprecipitating crude Alkali Blue from a caustic solution using a mineral acid, to obtain pigmentary properties, filtered and washed, is slurried and treated with (a) an acid solution of an amine containing from 3 to 36 carbon atoms and (b) an aqueous solution of alkyl aryl sulfonic acid and subsequently recovering said pigment composition.

3. The process of claim 1 or 2 wherein said alkyl aryl sulfonic acid contains from 1 to 14 carbon atoms in the alkyl chain.

4. The process of claim 1 or 2 wherein the temperature employed ranges from 40° C. to 100° C.

5. A soft textured high strength Alkali Blue pigment composition prepared by dissolving crude Alkali Blue, produced by phenylation with aniline of parafuchsin, sulfonation primarily to mono with sulfuric acid and subsequent drowning in water, in an aqueous solution of NaOH, mixing said solution with (a) an alkaline solution of an alkyl aryl sulfonic acid and (b) subsequently with an acid solution of an amine containing from 3 to 36 carbon atoms and recovering said pigment composition.

6. The product of claim 5 wherein said alkyl aryl sulfonic acid contains from 1 to 14 carbon atoms in the alkyl chain.

7. The product of claim 5 wherein the temperature employed during the process ranges from 50° C. to 100° C.

8. The product of claim 5 where the pigment content is in the range 60 to 95 percent by weight.

9. The product of claim 5 where the amine used is dimethyloctadecylamine or N-coco amine, or N-coco-1, 3-diaminopropane.

10. The product of claim 9 where the alkyl aryl sulfonic acid used is dodecylbenzene sulfonic acid.

11. The product of claim 5 where the acid used to dissolve the amine is a water soluble carboxylic acid.

12. The process of claim 1, 2 or 5 wherein the total additive concentration in the final product is in the range 5 to 40 percent by weight.

* * * * *